United States Patent
Worley et al.

(10) Patent No.: US 10,114,778 B2
(45) Date of Patent: Oct. 30, 2018

(54) MULTI-PROTOCOL IO INFRASTRUCTURE FOR A FLEXIBLE STORAGE PLATFORM

(71) Applicant: SAMSUNG ELECTRONICS CO., LTD., Suwon-Si, Gyeonggi-do (KR)

(72) Inventors: Fred Worley, San Jose, CA (US); Harry Rogers, San Jose, CA (US); Sreenivas Krishnan, Campbell, CA (US); Zhan Ping, Milpitas, CA (US); Michael Scriber, Hayward, CA (US)

(73) Assignee: Samsung Electronics Co., Ltd., Suwon-si (KR)

(*) Notice: Subject to any disclaimer, the term of this patent is extended or adjusted under 35 U.S.C. 154(b) by 264 days.

(21) Appl. No.: 15/090,409

(22) Filed: Apr. 4, 2016

(65) Prior Publication Data
US 2016/0328347 A1  Nov. 10, 2016

Related U.S. Application Data (60) Provisional application No. 62/158,714, filed on May 8, 2015.

(51) Int. Cl.
| | |
|---|---|
| *G06F 13/00* | (2006.01) |
| *G06F 13/38* | (2006.01) |
| *G06F 13/42* | (2006.01) |
| *G06F 13/40* | (2006.01) |

(52) U.S. Cl.
CPC ........ *G06F 13/385* (2013.01); *G06F 13/4022* (2013.01); *G06F 13/4282* (2013.01)

(58) Field of Classification Search
CPC ................. G06F 13/385; G06F 13/4022
See application file for complete search history.

(56) References Cited

U.S. PATENT DOCUMENTS

| | | | |
|---|---|---|---|
| 6,738,937 B1 | 5/2004 | Bergsten | |
| 7,020,600 B2 | 3/2006 | Deao et al. | |
| 7,075,793 B2 | 7/2006 | Le et al. | |
| 7,478,221 B1 | 1/2009 | Karr et al. | |
| 7,844,444 B1 | 11/2010 | Asbridge et al. | |
| 8,065,133 B1 | 11/2011 | Asbridge | |
| 8,645,626 B2 | 2/2014 | Mittendorff et al. | |
| 8,806,156 B2 | 8/2014 | Yamamoto et al. | |
| 2009/0077299 A1 | 3/2009 | Wang et al. | |
| 2009/0172235 A1 | 7/2009 | Yan et al. | |
| 2013/0160001 A1 | 6/2013 | Graham et al. | |
| 2016/0124872 A1* | 5/2016 | Shrader | G06F 13/161 710/36 |
| 2017/0068628 A1* | 3/2017 | Calciu | G06F 13/4022 |
| 2017/0262380 A1* | 9/2017 | Yoshida | G06F 12/1009 |

* cited by examiner

*Primary Examiner* — Tammara R Peyton
(74) *Attorney, Agent, or Firm* — Lewis Roca Rothgerber Christie LLP (57) ABSTRACT

A flexible storage system. A storage motherboard accommodates, on a suitable connector, a storage adapter circuit that provides protocol translation between a host bus interface and a storage interface, and that provides routing, to accommodate a plurality of mass storage devices that may be connected to the storage adapter circuit through the storage motherboard. The storage adapter circuit may be replaced with a circuit supporting a different host interface or a different storage interface.

15 Claims, 12 Drawing Sheets

MULTI-PROTOCOL IO INFRASTRUCTURE FOR A FLEXIBLE STORAGE PLATFORM

CROSS-REFERENCE TO RELATED APPLICATION(S)

The present application claims priority to and the benefit of U.S. Provisional Application No. 62/158,714, filed May 8, 2015, entitled "Multi-protocol IO infrastructure for a flexible storage platform", the entire content of which is incorporated herein by reference.

FIELD

One or more aspects of embodiments according to the present invention relate to data storage, and more particularly to an infrastructure for providing a multi-protocol storage interface.

BACKGROUND

Modern computer systems may consist of processing resources, non-volatile memory and persistent storage. The persistent storage communicates with the local processing resources through a storage protocol that is specific to the storage resource. The storage resource may support one such protocol and the computer system may support a separate infrastructure to support that protocol, because, for example, of differences in protocol, connector type, cable type, trace type, and/or data path width, or other variations in protocol specifics.

The separate infrastructure required to support different storage protocols limits the flexibility of the design of the overall computer system. Thus, there is a need for a common infrastructure that supports multiple protocols.

SUMMARY

According to an embodiment of the present invention there is provided a storage system, including: a storage motherboard, including: a first plurality of storage interface connectors; a first adapter connector; and a cable connector; a first storage adapter circuit including a first motherboard connector compatible with the first adapter connector, and being configured to support, at the first motherboard connector: a first storage interface; and a host interface; and a second storage adapter circuit including a first motherboard connector compatible with the first adapter connector, and being configured to support, at the first motherboard connector: a first storage interface; and a host interface, the first storage interface of the first storage adapter circuit being different from the first storage interface of the second storage adapter circuit, and/or the host interface of the first storage adapter circuit being different from the host interface of the second storage adapter circuit.

In one embodiment, the first storage adapter circuit includes a routing circuit.

In one embodiment, the first storage adapter circuit further includes a protocol translation circuit.

In one embodiment, the system includes a third storage adapter circuit including a first motherboard connector compatible with the first adapter connector and with the second adapter connector, and being configured to support, at the first motherboard connector: a first storage interface; and a host interface, the first storage interface of the third storage adapter circuit being different from the first storage interface of the second storage adapter circuit and/or the host interface of the third storage adapter circuit being different from the host interface of the second storage adapter circuit.

In one embodiment, the first storage adapter circuit is further configured to provide a second storage interface at the first motherboard connector of the first storage adapter, the second storage interface being the same as the first storage interface of the first storage adapter circuit.

In one embodiment, the first storage adapter circuit is further configured to provide a second storage interface at the first motherboard connector of the first storage adapter, the second storage interface being different from the first storage interface of the first storage adapter circuit.

In one embodiment, the first storage interface of the first storage adapter circuit includes a SATA interface and the second storage interface includes a SAS interface.

In one embodiment, the host interface of the first storage adapter circuit includes a PCIe interface, and the first storage interface of the first storage adapter circuit includes an interface selected from the group consisting of SATA, SAS, FibreChannel, NVMe, Ethernet, and USB.

In one embodiment, the host interface of the first storage adapter circuit includes a PCIe interface, and the first storage interface of the first storage adapter circuit includes a PCIe interface.

In one embodiment, the host interface of the first storage adapter circuit includes a SAS interface, and the first storage interface of the first storage adapter circuit includes a SAS interface.

In one embodiment, a connector of the first plurality of storage interface connectors is compatible with at least two different storage interfaces.

In one embodiment, a connector of the first plurality of storage interface connectors includes an SFF8639 connector.

According to an embodiment of the present invention there is provided a storage system, including: a storage motherboard, including: a first plurality of storage interface connectors; a first adapter connector; and a cable connector; a first storage adapter circuit including: a first motherboard connector compatible with the first adapter connector, and a first storage connector, the first storage adapter circuit supporting: a first storage interface at the first storage connector of the first storage adapter circuit; and a host interface at the first motherboard connector of the first storage adapter circuit; and a second storage adapter circuit including: a first motherboard connector compatible with the first adapter connector, and a first storage connector, the second storage adapter circuit supporting: a first storage interface at the first storage connector of the second storage adapter circuit; and a host interface at the first motherboard connector of the second storage adapter circuit, the first storage interface of the first storage adapter circuit being different from the first storage interface of the second storage adapter circuit, and/or the host interface of the first storage adapter circuit being different from the host interface of the second storage adapter circuit.

In one embodiment, the system includes a mass storage device connected to the first storage connector of the first storage adapter circuit by a data path including a portion selected from the group consisting of a cable, a plurality of printed circuit board traces, and a wireless link.

In one embodiment, the first motherboard connector of the first storage adapter circuit includes a PCIe connector, and the host interface of the first storage adapter circuit is PCIe.

In one embodiment, the system includes a third storage adapter circuit including: a first motherboard connector compatible with the first adapter connector and with the second adapter connector, and a first storage connector, the third storage adapter circuit supporting: a first storage interface at the first storage connector of the third storage adapter circuit supporting; and a host interface at the first motherboard connector of the third storage adapter circuit supporting, the first storage interface of the third storage adapter circuit being different from the first storage interface of the second storage adapter circuit, and/or the host interface of the third storage adapter circuit being different from the host interface of the second storage adapter circuit.

According to an embodiment of the present invention there is provided a computing system, including: a rack tray for a 19-inch rack, the rack tray including: a host motherboard including a CPU and memory; a storage motherboard, including: a first plurality of storage interface connectors; a first adapter connector; and a cable connector; a first storage adapter circuit including a first motherboard connector compatible with the first adapter connector, and being configured to support, at the first motherboard connector: a first storage interface; and a host interface; and a second storage adapter circuit including a first motherboard connector compatible with the first adapter connector, and being configured to support, at the first motherboard connector: a first storage interface; and a host interface, the first storage interface of the first storage adapter circuit being different from the first storage interface of the second storage adapter circuit, and/or the host interface of the first storage adapter circuit being different from the host interface of the second storage adapter circuit; and a cable connected to the cable connector of the storage motherboard and to the host motherboard.

In one embodiment, the system includes a third storage adapter circuit including a first motherboard connector compatible with the first adapter connector and with the second adapter connector, and being configured to support, at the first motherboard connector: a first storage interface; and a host interface; the first storage interface of the third storage adapter circuit being different from the first storage interface of the second storage adapter circuit, and/or the host interface of the third storage adapter circuit being different from the host interface of the second storage adapter circuit.

In one embodiment, the first storage adapter circuit is further configured to provide a second storage interface at the first motherboard connector of the first storage adapter, the second storage interface being the same as the first storage interface of the first storage adapter circuit.

In one embodiment, the first storage adapter circuit is further configured to provide a second storage interface at the first motherboard connector of the first storage adapter, the second storage interface being different from the first storage interface of the first storage adapter circuit.

According to an embodiment of the present invention there is provided a storage system, including: a storage motherboard, including: a first plurality of storage interface connectors; a cable connector; and a storage adapter circuit having a host side interface connected to the cable connector and a first plurality of storage side interfaces, each connected to a respective storage interface connector of the storage interface connectors, the storage adapter circuit including: a first protocol translator, configured to translate communications from a host interface protocol to a first storage interface protocol; a second protocol translator, configured to translate communications from a host interface protocol to a second storage interface protocol; a first consolidation device configured to connect the first protocol translator to a plurality of storage devices configured to use the first storage interface protocol; a second consolidation device configured to connect the second protocol translator to a plurality of storage devices configured to use the second storage interface protocol; and a storage adapter circuit controller configured to: detect a protocol of a mass storage device connected to a connector of the first plurality of storage interface connectors, connect the first protocol translator to the host side interface, and connect the first consolidation device between the first protocol translator and the first plurality of storage side interfaces, when the detected protocol is the first protocol, and connect the second protocol translator to the host side interface, and connect the second consolidation device between the second protocol translator and the first plurality of storage side interfaces, when the detected protocol is the second protocol.

In one embodiment, the first protocol translator is a PCIe host bus adapter for SAS, the first consolidation device is a SAS expander, the second protocol translator is a PCIe host bus adapter for SATA, and the second consolidation device is a SATA expander.

BRIEF DESCRIPTION OF THE DRAWINGS

These and other features and aspects of the present invention will be appreciated and understood with reference to the specification, claims, and appended drawings wherein:

DETAILED DESCRIPTION

The detailed description set forth below in connection with the appended drawings is intended as a description of example embodiments of a multi-protocol IO infrastructure for a flexible storage platform provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

Figure 1:
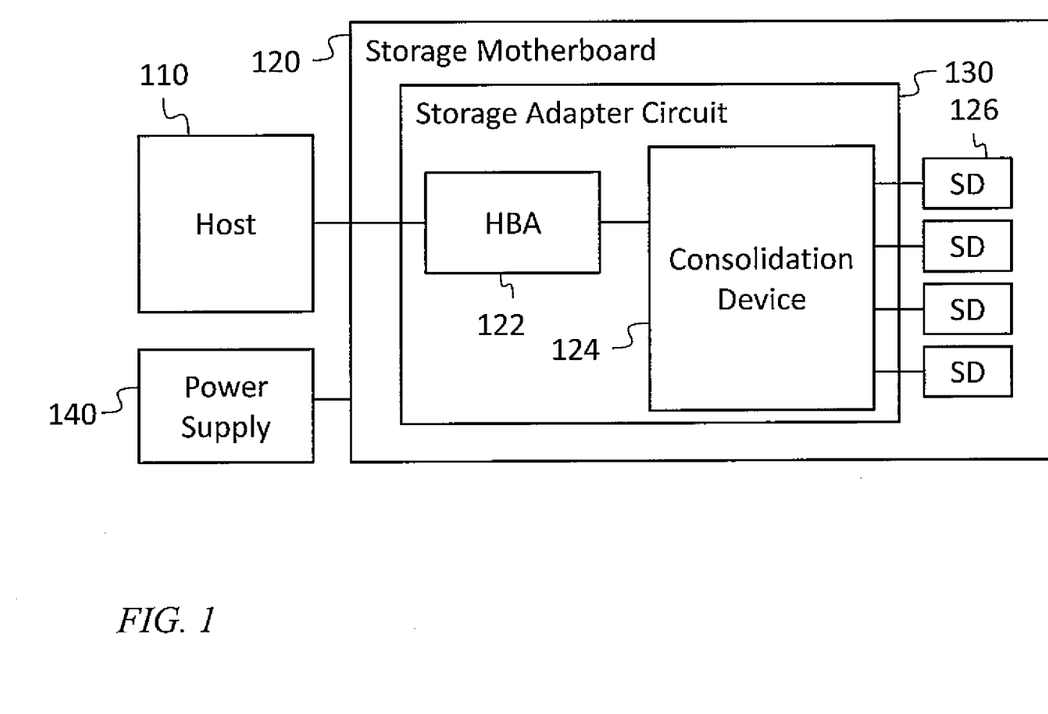
FIG. 1 is a block diagram of a host and power supply connected to a storage motherboard, according to an embodiment of the present invention.

Referring to FIG. 1, in one embodiment, a host 110 is connected to a storage motherboard 120 that provides data storage (e.g., persistent data storage) for the host 110. The host 110 may include a CPU, memory, and a host storage connector for connecting to a storage system such as the storage motherboard 120. If the host 110 includes a host bus adapter (HBA) 122, the host interface, i.e., the interface between the host 110 and the storage motherboard 120, may be a storage interface, or, if the host 110 does not include a host bus adapter 122 (as illustrated, for example, in FIG. 1), the host interface may be a host bus interface, e.g., a Peripheral Component Interconnect Express (PCIe) interface. As used herein, a storage interface is a category of interface that is used as an interface to a mass storage device such as hard disk drives or a solid state drives (SSD). A storage interface may be, for example, a Serial Advanced Technology Attachment (SATA) interface, a Fibre Channel interface, a Serial Attached SCSI (SAS) interface, a Non Volatile Memory Express (NVMe) interface, or a more general-purpose interface such as Ethernet or Universal Serial Bus (USB). As used herein, a "host bus adapter" is any circuit that acts as a protocol translator, to perform protocol translation between the protocol used by the host side interface of the storage motherboard 120, and a protocol used by a storage side interface of the storage motherboard 120. The host bus adapter 122 may be implemented in a custom application specific integrated circuit (ASIC), a system on a chip (SOC), or the like.

As illustrated in FIG. 1 for one example embodiment, the storage motherboard 120 may include a host bus adapter 122, a consolidation device 124, and a plurality of mass storage devices (SD) 126. The host bus adapter 122 and the consolidation device 124 may be packaged together in a physical package referred to herein as a storage adapter circuit 130. The mass storage devices 126 may be solid state drives (SSDs). The consolidation device 124 may act as a routing circuit, e.g., directing each read or write request received from the host 110 to one of several storage devices connected to the consolidation device 124 (the one storage device being selected, e.g., according to a storage address included in the read or write request). In some embodiments, the consolidation device 124 is a router, a switch, an expander, or a hub for signals transmitted over the storage interface. The storage motherboard 120 may receive power from the host 110, or, as illustrated in FIG. 1, from a separate power supply 140, and the storage motherboard 120 may provide this power to the storage adapter circuit 130, the mass storage devices 126, and any other elements installed in the storage motherboard 120 that require power. The storage motherboard 120 may be constructed on a printed circuit board (PCB) (or "printed wiring board" (PWB)), that may provide connections, in the form of PCB traces, between the connectors and the other electrical elements, if any, installed on the storage motherboard PCB. The PCB may also support various elements of the storage motherboard 120 (e.g., the mass storage devices 126) physically, having for example brackets for supporting these elements, or threaded inserts using which, together with threaded fasteners, these elements may be secured to the storage motherboard 120.

In some embodiments, the storage adapter circuit 130 can have an adapter connector through which it is connected to a corresponding adapter connector on the storage motherboard 120. The adapter connector provides electrical connections between the storage adapter circuit 130 and the storage motherboard 120, and it may also secure the storage adapter circuit 130 mechanically to the storage motherboard 120. A host side of the storage adapter circuit 130 interfaces with the host 110, e.g., through a host side portion of adapter connector, and a storage side of the storage adapter circuit 130 interfaces with one or more mass storage devices 126, e.g., through a storage side portion of the adapter connector. Accordingly, the storage adapter circuit 130 may relay read and write requests from the host 110 to one or more of the mass storage devices 126, and relay any response returned by a mass storage device 126 back to the host 110.

As a result of being connected to the storage motherboard 120 by a connector, the storage adapter circuit 130 may be readily replaced, e.g., in case of failure, or to substitute a different storage adapter circuit 130. Connections between the storage adapter circuit 130 and other elements of the system may be made through the adapter connector, and, e.g., through PCB traces in the storage motherboard PCB. For example, the connection between the host 110 and the storage adapter circuit 130 may include conductors in the following connecting elements: a connector on the host 110, a cable forming a connection between the connector on the host 110 and a host connector on the storage motherboard, PCB traces between the host connector on the storage motherboard 120 and the adapter connector, and the adapter connector, amongst other possibilities. In some embodiments the connections to the storage adapter circuit 130 are not made through the adapter connector; they may be made instead, for example, by one or more cables connected directly between a mass storage device 126 and the storage adapter circuit 130.

Figure 2A:
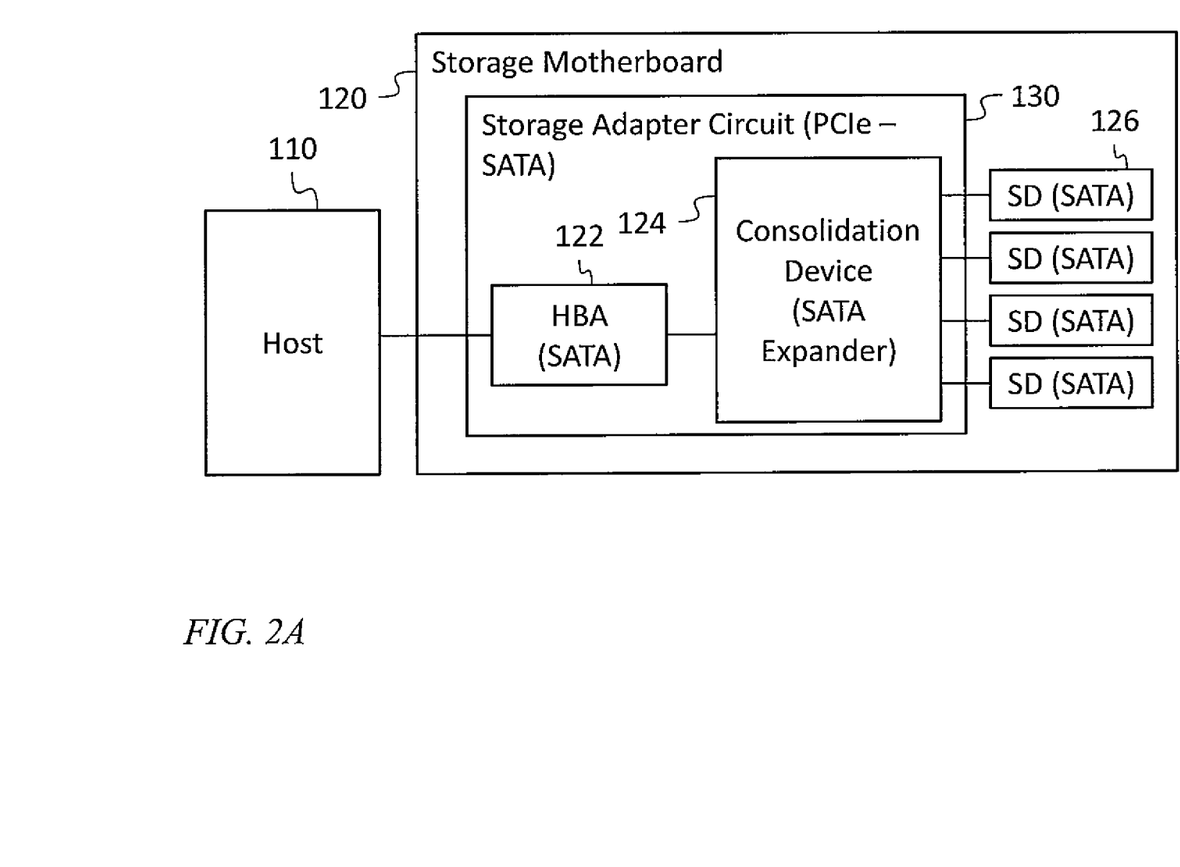
FIG. 2A is a block diagram of a host connected to a storage motherboard, according to an embodiment of the present invention.

Referring to FIG. 2A, in one embodiment a host 110 is connected to a storage motherboard 120 through a connection to the host bus, which may, for example, be a PCIe bus. The storage adapter circuit 130 has a host bus adapter 122 that acts as a protocol translation circuit, translating between the protocol of the host bus (PCIe) and the protocol of a storage interface, (e.g., SATA, PCIe, or SAS), as illustrated in the embodiment of FIG. 2A. The consolidation device 124 in the embodiment of FIG. 2A is connected between the host bus adapter 122 and a plurality of mass storage devices 126, (e.g., SATA, etc. storage devices), as illustrated in the embodiment of FIG. 2A. In the embodiment of FIG. 2A, the consolidation device 124 is a SATA expander. In other embodiments, it is a PCIe switch or a SAS expander, or the like.

In some embodiments the circuitry of the host bus adapter 122 and of the consolidation device 124 may be combined into a single custom ASIC.

In some embodiments, the consolidation device 124 (or the combination of the host bus adapter 122 and the consolidation device 124) is a system-on-a-chip (SOC) processor that provides protocol translation and routing between the mass storage devices 126 and some other entity, such as a compute resource (e.g., a host). The SOC processor in this embodiment may also provide additional protocol support or services such as compression, deduplication, or replication. In such an embodiment, the SOC processor may also provide computing capability that may be of general or specific purpose use as part of the implementation of the storage protocol or as an augmented capability of the storage motherboard 120 that is made available to applications ("in-storage compute" capability).

Figure 2B:
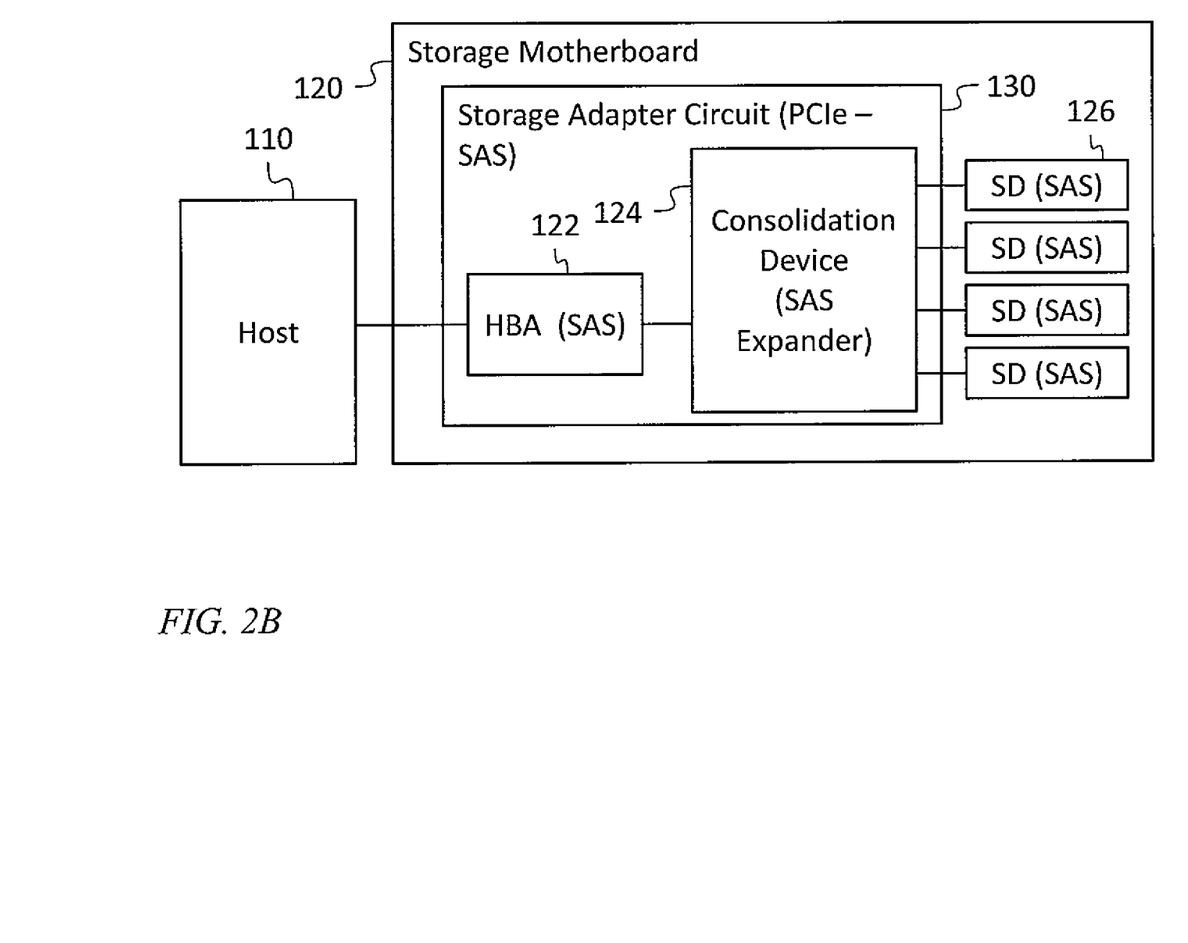
FIG. 2B is a block diagram of a host connected to a storage motherboard, according to an embodiment of the present invention.

An operator of a system (e.g., a server cluster) including the host 110 and the storage motherboard 120 may, in the embodiment of FIG. 2A, readily replace the mass storage devices 126 with mass storage devices 126 configured to use a different storage interface (e.g., mass storage devices 126 configured to use SAS instead of SATA), if, for example, some of the mass storage devices 126 have failed, or if they are to be replaced with mass storage devices 126 having greater storage capacity. To do so, the operator may add to or replace the storage adapter circuit 130 of the embodiment of FIG. 2A with, as illustrated in FIG. 2B, a suitable storage adapter circuit 130 compatible, on the host side, with PCIe, and compatible, on the mass storage side, with SAS. If the connectors of the replacement mass storage devices 126 are physically intercompatible with the connectors of the mass storage devices 126 being replaced (as is the case for various storage interfaces using the SFF8639 connector, discussed in further detail below), then each replacement mass storage device 126 may be plugged into the connector vacated when the mass storage device 126 being replaced was removed. In other embodiments, the storage motherboard 120 may provide several sets of different connectors for different storage interfaces, so that, for example, a new mass storage device 126 replacing an old mass storage device 126 may be plugged into a connector adjacent to (and different from) a connector vacated by the removal of the old mass storage device 126.

Figure 3:
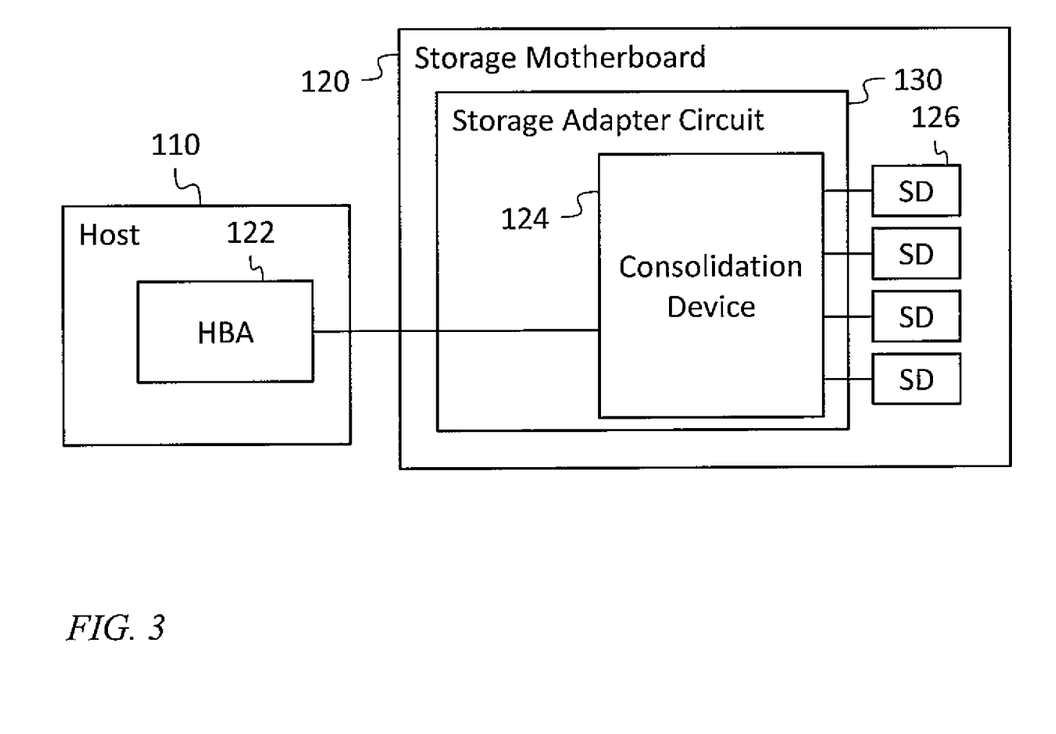
FIG. 3 is a block diagram of a host connected to a storage motherboard, according to an embodiment of the present invention.

Referring to FIG. 3, in some embodiments, the host 110 includes a host bus adapter 122, so that the host interface (i.e., the interface between the host 110 and the storage motherboard 120) is, instead of being a host bus interface (as in the embodiment of FIG. 1), a storage interface. In these embodiments the storage adapter circuit 130 may include a consolidation device 124 and it may lack a host bus adapter 122.

Figure 4A:
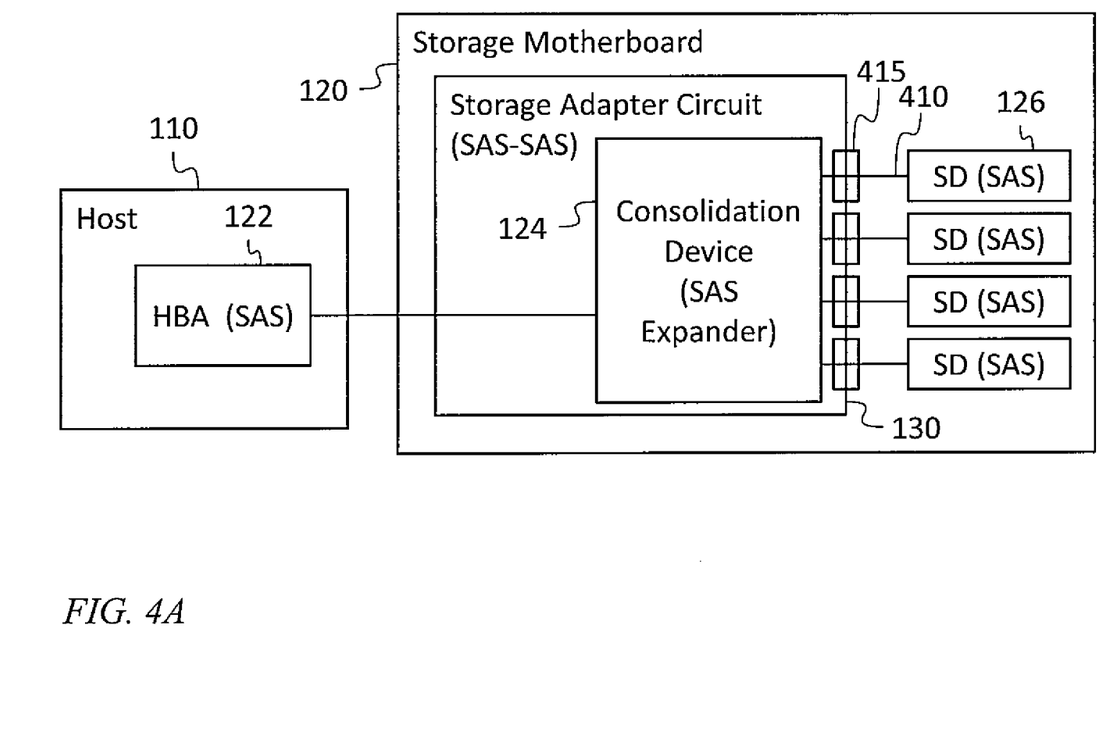
FIG. 4A is a block diagram of a host connected to a storage motherboard, according to an embodiment of the present invention.
Figure 4B:
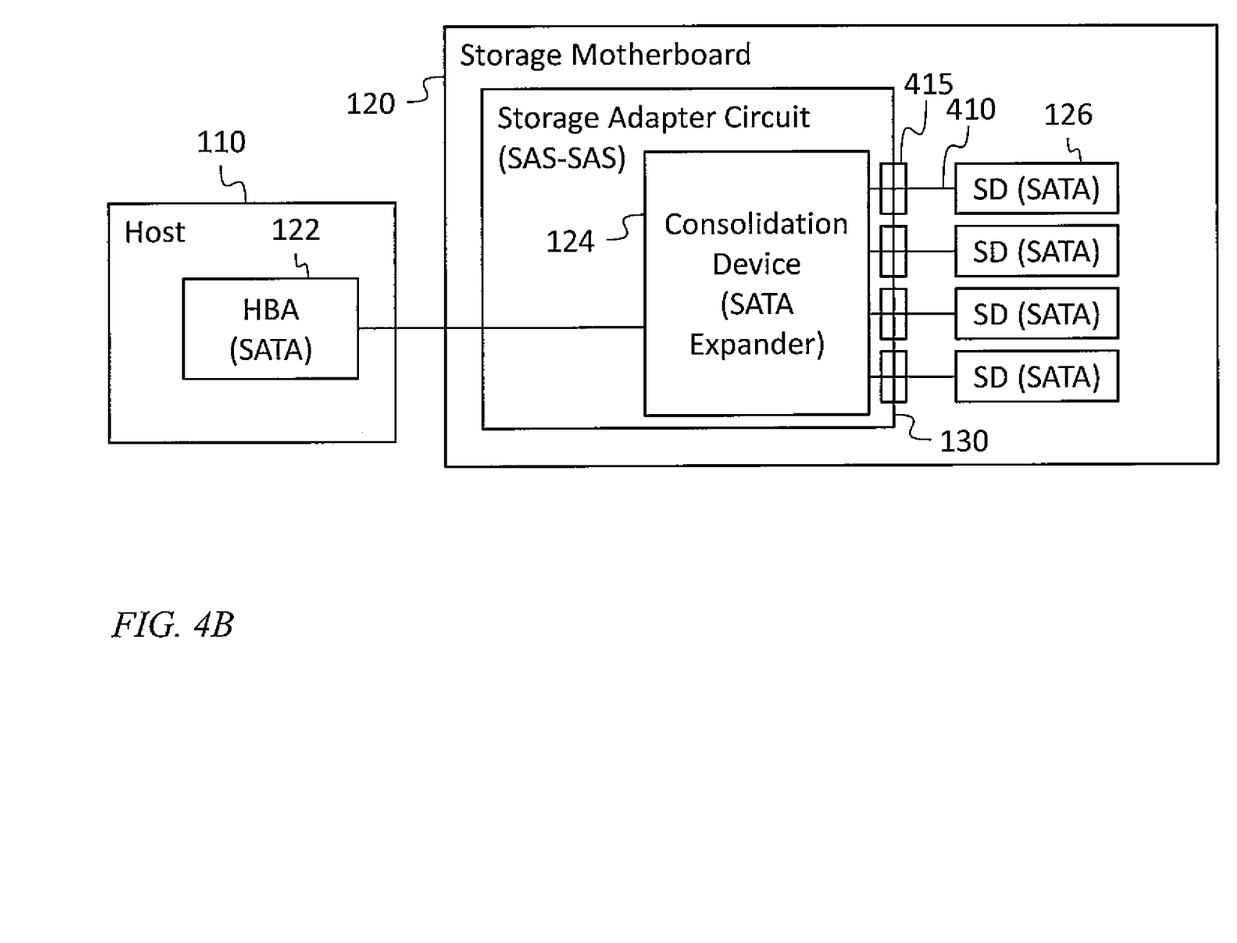
FIG. 4B is a block diagram of a host connected to a storage motherboard, according to an embodiment of the present invention.

Referring to FIG. 4A, in one such embodiment, for example, the host 110 includes a host bus adapter 122 providing a SAS interface, and the consolidation device 124 includes a SAS expander. A plurality of mass storage devices 126 compatible with the SAS storage interface is installed on the storage motherboard 120, connected to the storage adapter circuit 130. Referring to FIG. 4B, in a related embodiment, the host 110 includes a host bus adapter 122 providing a SATA interface, and the consolidation device 124 includes a SATA expander. A plurality of mass storage devices 126 compatible with the SATA storage interface is installed on the storage motherboard 120, connected to the storage adapter circuit 130.

In the embodiments of FIG. 4A and FIG. 4B, the storage adapter circuit 130 may have the form factor of a PCIe card, and the adapter connector may be a PCIe connector, that supports the storage adapter circuit 130 and provides connections to the host 110. One or more connections to mass storage devices 126 may then be made using cables 410, e.g., cables 410 installed between storage connectors 415 on the storage adapter circuit 130 and corresponding storage connectors on the mass storage devices 126.

Figure 5:
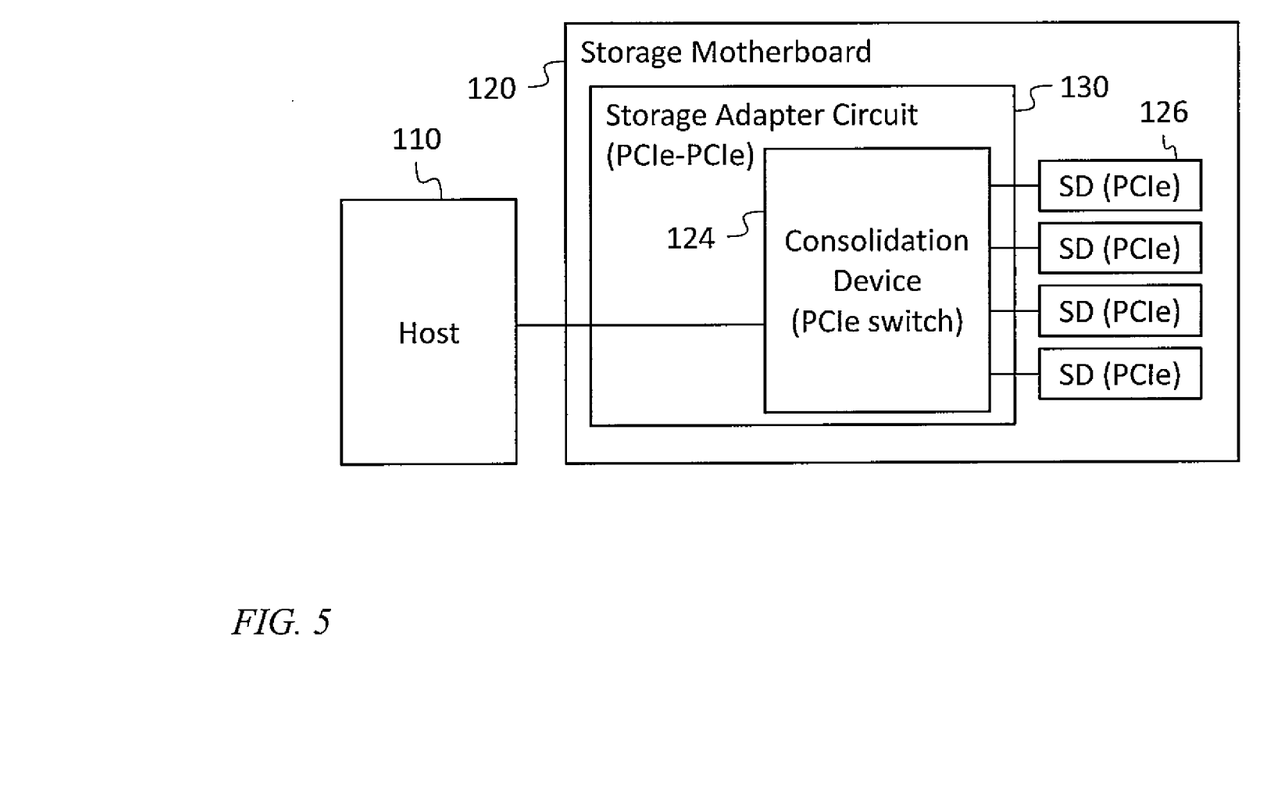
FIG. 5 is a block diagram of a host connected to a storage motherboard, according to an embodiment of the present invention.

If the storage interface of the mass storage devices 126 is the host interface, then protocol translation may be unnecessary in the storage motherboard 120 and in the storage adapter circuit 130. Referring to FIG. 5, in one embodiment the storage adapter circuit 130 lacks a host bus adapter 122, the host bus interface is PCIe, the consolidation device 124 is a PCIe switch, and the storage devices are PCIe drives.

Figure 6A:
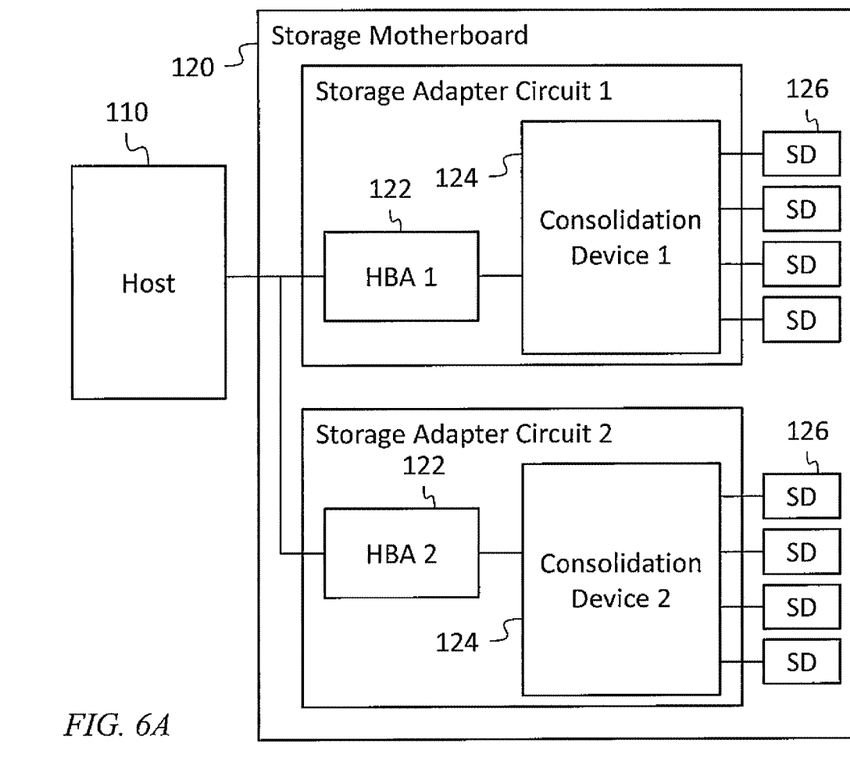
FIG. 6A is a block diagram of a host connected to a storage motherboard, according to an embodiment of the present invention.

Referring to FIG. 6A, in some embodiments the storage motherboard 120 includes connectors for, and supports, two or more storage adapter circuits simultaneously (e.g., concurrently). In such an embodiment, a first plurality of storage devices using a first storage interface may be connected to a first storage adapter circuit, and a second plurality of storage devices using a second storage interface, different from the first storage interface, may be connected to a second storage adapter circuit. In such an embodiment one storage interface may be selected to provide high performance, and another storage interface may be selected to provide low cost (e.g., to accommodate low-cost mass storage devices). In some embodiments the storage motherboard 120 supports and includes more than two storage adapter circuits, e.g., between 3 and 20 storage adapter circuits.

Figure 6B:
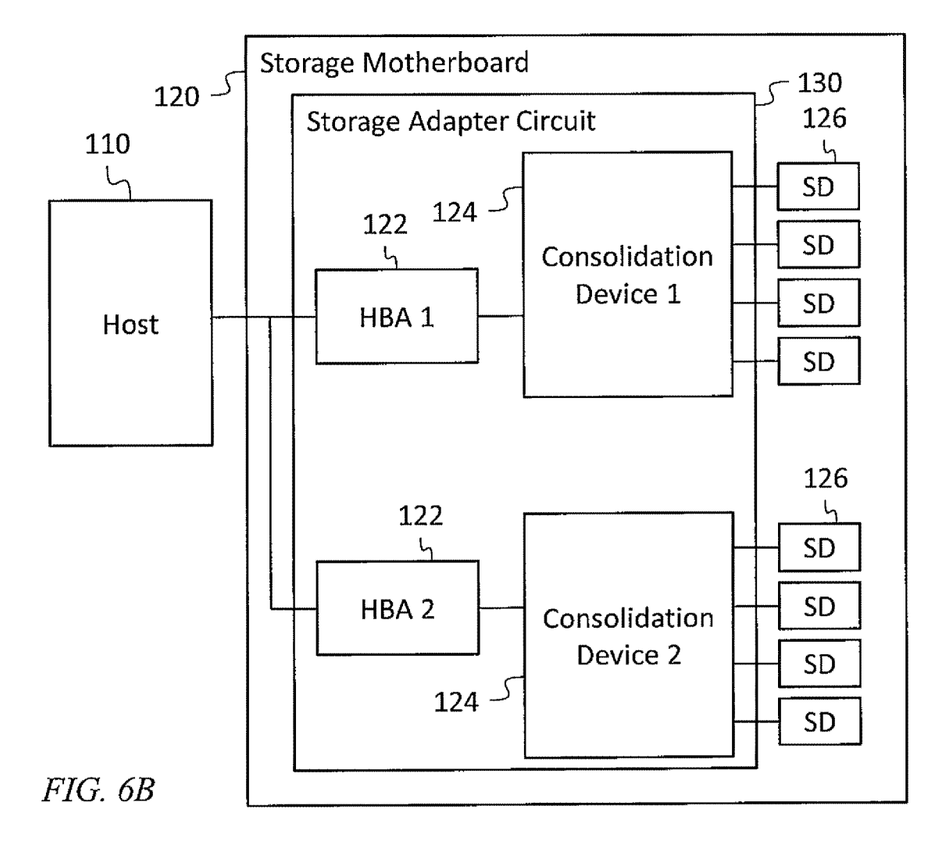
FIG. 6B is a block diagram of a host connected to a storage motherboard, according to an embodiment of the present invention.

Referring to FIG. 6B, in one embodiment, a single storage adapter circuit simultaneously (e.g., concurrently) supports a first plurality of mass storage devices using a first storage interface, and a second plurality of mass storage devices using a second storage interface. To support the first plurality of mass storage devices, the storage adapter circuit 130 includes a first host bus adapter 122 to perform protocol translation between the host bus interface and the first storage interface, and a first consolidation device 124 to perform routing to the first plurality of mass storage devices. To support the second plurality of mass storage devices, the storage adapter circuit 130 includes a second host bus adapter 122 to perform protocol translation between the host bus interface and the second storage interface, and a second consolidation device 124 to perform routing to the second plurality of mass storage devices. In some embodiments, a storage adapter circuit 130 includes more than two host bus adapters and two consolidation devices, e.g., between 3 and 20 of each.

Figure 7A:
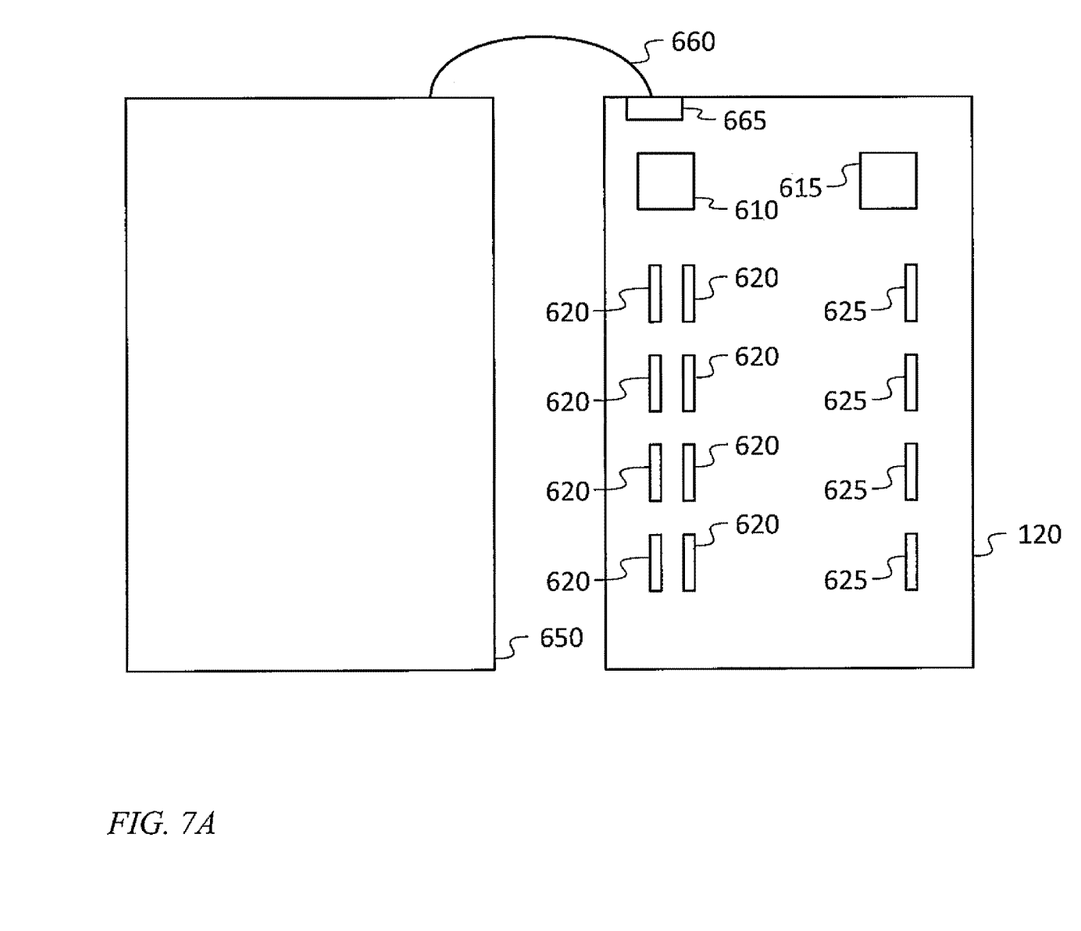
FIG. 7A is a schematic plan view of a host connected to a storage motherboard, according to an embodiment of the present invention.

Referring to FIG. 7A, in some embodiments, the layout of a storage motherboard 120 is schematically as shown. A first adapter connector 610 is installed in the motherboard and is configured to support a first storage adapter circuit. A second adapter connector 615 is installed in the motherboard and is configured to support a second storage adapter circuit (the storage adapter circuits are not shown in FIG. 7A). The first adapter connector 610 is connected to an array of first storage interface connectors 620. Each of the first storage interface connectors 620 may be used to connect a mass storage device to the storage motherboard (and to the first storage adapter circuit).

The connector type used for the storage interface connectors 620 may be a multi-protocol connector that supports more than one storage interface. For example, each of the storage interface connectors 620 may be an SFF8639 connector (which may also be referred to as a U.2 connector), which may be compatible with several storage interfaces, including SATA, NVMe over PCIe, and SAS. Moreover, it may be, or it may in the near future become, possible to employ the SFF8639 to transmit Ethernet signaling. In such an embodiment, it may be possible (as mentioned above) to replace a first set of mass storage devices configured for a first storage interface with a second set of mass storage devices configured for a second storage interface different from the first storage interface, both the first storage interface and the second storage interface being compatible with the multi-protocol connector, by plugging the replacement drives directly into the connectors vacated by the drives being replaced.

The second adapter connector 615 is connected to an array of second storage interface connectors 625. Each of the second storage interface connectors 625 (like the first storage interface connectors 620) may be used to connect a mass storage device to the storage motherboard (and to the second storage adapter circuit). In some embodiments the first storage connectors 620 may be configured to use a "2-lane" storage interface, i.e., one that employs 2 pins per storage device to transfer data, and the second storage interface connectors 625 may be configured to use a "4-lane" storage interface, i.e., one that employs 4 pins per storage device to transfer data.

A host (or "server") motherboard 650 may be connected to the storage motherboard 120 through a cable 660 that connects to a cable connector 665 on the storage motherboard. The host motherboard 650 and the storage motherboard 120 may be installed (e.g., side by side) in a tray (e.g., a 1U high tray, a 2U high tray, or a 3U high tray) in a 19-inch rack (e.g., a rack fabricated to comply with Electronic Industries Alliance standard EIA-310-D).

Figure 7B:
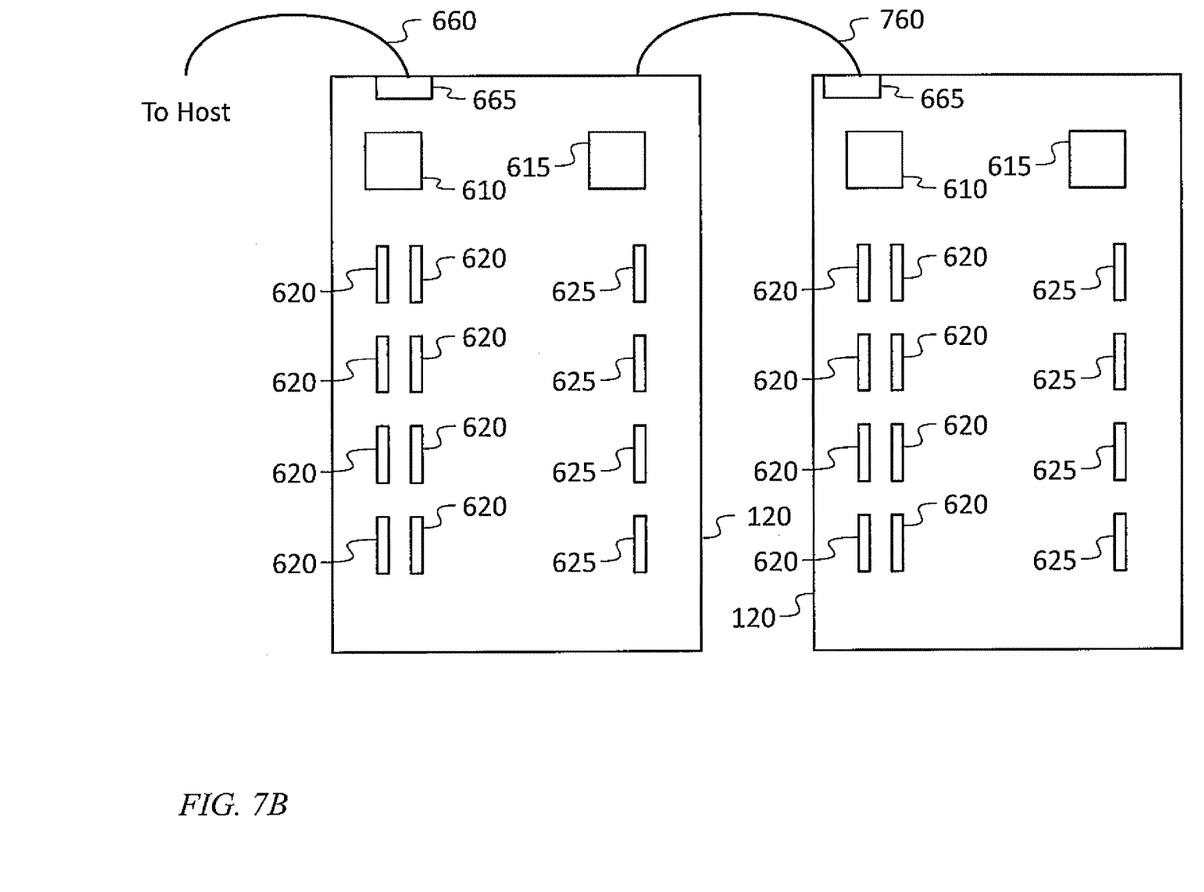
FIG. 7B is a schematic plan view of a storage motherboard connected to a storage motherboard, according to an embodiment of the present invention.

In some embodiments storage motherboards may be chained or cascaded to increase the total storage capacity available to a host. Referring to FIG. 7B, in one embodiment two storage motherboards 120 are connected together by a cable 760. The cable 660 connects the chained storage motherboards 120 to a host (not shown). A separate circuit on one of the storage motherboards 120 (or in one of the storage adapter circuits) may perform routing of signals from the host to one or the other of the storage motherboards 120. The two storage motherboards 120 may be installed (e.g., side by side) in a tray, and the cable 660 may extend to another tray in the same rack or in another rack. In this embodiment the tray containing the two storage motherboards 120 may be referred to as "just a bunch of flash" (JBOF).

Table 1 below shows examples of embodiments including various combinations of features. A first row, labeled "A", summarizes an embodiment in which the storage adapter circuit installed in the first adapter connector 610 includes a PCIe host bus adapter 122 for SAS, and a SAS expander, and the storage adapter circuit installed in the second adapter connector 615 includes PCIe switches, arranged in a hierarchy. This embodiment allows the storage motherboard 120 to be installed in a tray together with a host having a PCIe host interface. A second row, labeled "B", summarizes an embodiment in which the storage adapter circuit installed in the first adapter connector 610 includes a PCIe host bus adapter 122 for SAS, and a SAS expander, and the storage adapter circuit installed in the second adapter connector 615 includes PCIe switches and a baseboard management controller (BMC). The baseboard management controller may provide consolidation of management data, such as internal drive temperature. In this embodiment, the host interface is PCIe, and two storage motherboards 120 may be chained together in a tray to form a unit of JBOF based on PCIe. A third row, labeled "C", summarizes an embodiment in which the storage adapter circuit installed in the first adapter connector 610 includes Ethernet switches, and the storage adapter circuit installed in the second adapter connector 615 includes a baseboard management controller. In this embodiment two storage motherboards 120 may be chained together in a tray to form a unit of JBOF based on Ethernet.

TABLE 1

| | Form Factor | 2 pin per SSD slot | 4 pin per SSD slot |
|---|---|---|---|
| A | Single tray with host | [SAS Expander/HBA] | [PCI switch(es) (hierarchy)] |
| B | Switched PCIe/SAS JBOF | [SAS Expander/HBA] | PCI switch(es) + BMC |
| C | Switched Ethernet JBOF | [Ethernet switch(es)] | BMC |

In some embodiments, the storage interface connectors 620 are multi-protocol connectors (supporting, e.g., both a 2-lane and a 4-lane protocol) and the storage motherboard has a single data path from each mass storage device to the storage adapter circuit, and provides a selection mechanism, such as a multiplexer, or "MUX", at one end of the data path, making it possible to configure which of the available data path "lanes" are active at any given time. For example, a detection pin from either the mass storage device or the consolidation device 124 may be used to identify the protocol used by the mass storage device and/or consolidation device 124 and transition the active data path within the connector from one protocol to another. In such an embodiment, a single 4-lane cable may be used and dynamically configured to use, for example, all the lanes for a PCIe configuration or to use two of the lanes for a SAS configuration and, in each case, map the data lanes to the appropriate pins on the connector for the given protocol.

In some embodiments, devices other than mass storage devices are used in place of the mass storage devices of the embodiments described above, and some embodiments may be considered as a general architecture for any connected device that may require simultaneous (e.g., concurrent) or sequential connectivity to potentially multiple protocols over potentially multiple physical infrastructures. For example, a microserver in the form factor of a mass storage device may connect to both PCIe and Ethernet, or an Ethernet-attached SSD may attach to both Ethernet and an I2C bus for communication of management data. In another embodiment, a device installed in the place of a mass storage device may be an enclosure containing volatile random access memory (RAM) or a combination of volatile RAM, a battery or capacitor to maintain the RAM state in the case of power loss, and a persistent memory technology (such as flash memory) to hold the data should a power loss occur.

Figure 8:
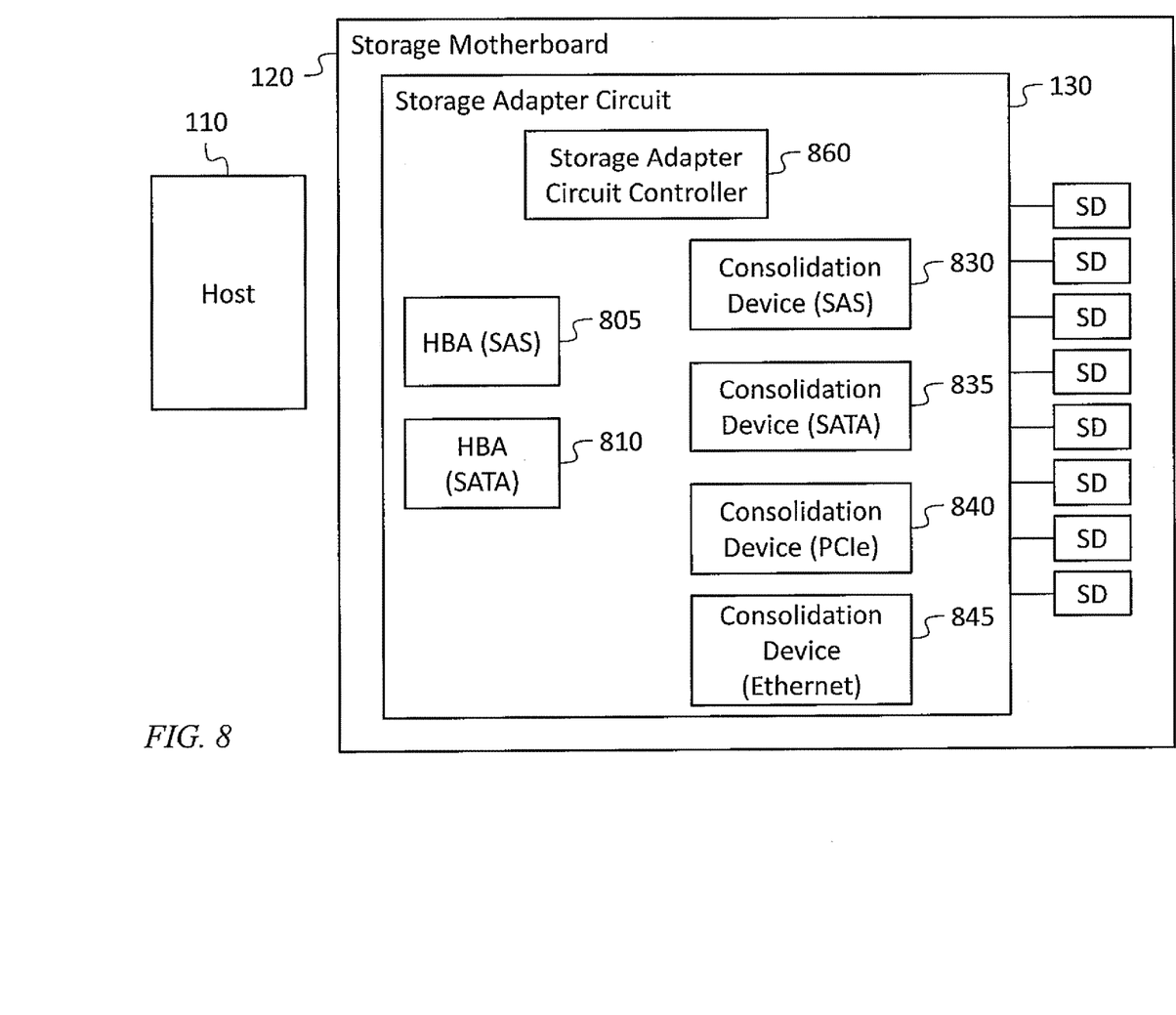
FIG. 8 is a block diagram of a host connected to a storage motherboard, according to an embodiment of the present invention.

Referring to FIG. 8, in some embodiments, a single storage adapter circuit may include a plurality of protocol translation and routing elements as building blocks 805-845, and be capable of supporting several different storage interfaces. For example, the storage adapter circuit may include, as options for a host bus adapter, a PCIe host bus adapter for SAS 805, a PCIe host bus adapter for SATA 810, and it may include, as options for the consolidation device, a SAS expander 830, a SATA expander 835, a PCIe switch 840, and an Ethernet consolidation device (e.g., an Ethernet hub, switch, or router). In other embodiments host bus adapters and consolidation devices for any other combination of host side protocol (including, e.g., Ethernet) and storage side protocol (including, e.g., InfiniBand) may be included in the storage adapter circuit. A storage adapter circuit controller 860 in the storage adapter circuit may, at startup, or when a new connection is established on the host side or on the storage side, negotiate protocol with the newly connected entity, and configure the storage adapter circuit accordingly.

For example, if the storage adapter circuit controller 860 detects that the protocol on the storage side is SAS, it may connect the PCIe host bus adapter for SAS 805 to the host side interface of the storage adapter circuit, and connect the SAS expander 830 between the PCIe host bus adapter for SAS 805 and the storage side interfaces of the storage adapter circuit. The other building blocks 810, 835, 840 may be unused in this configuration. In another example, if the storage adapter circuit controller 860 detects that the protocols are the same on the host side and on the storage side, then all of the protocol translation building blocks 805, 810 may be unused, and the storage adapter circuit controller may simply connect a suitable routing element (e.g., the PCIe switch 840, if the host interface is PCIe, and the interfaces to the mass storage devices are PCIe) between the host side interface and the storage side interfaces.

In some embodiments the storage adapter circuit controller 860 of the storage adapter circuit 130 of FIG. 8 may at any time, connect at most one host bus adapter 805, 810 and at most one consolidation device 830, 835, 840, 845 between the host side interface and the storage side interfaces of the storage adapter circuit, as described above. In other embodiments the storage adapter circuit controller 860 may be configured to connect more than one of the host bus adapters 805, 810 and more than one of the consolidation device 830, 835, 840, 845 concurrently between the host side interface and the storage side interfaces, so that the storage motherboard may include multiple mass storage devices SD with different protocols, concurrently connected to the storage adapter circuit 130.

For example, a system may include both SAS and NVMe mass storage devices, and the host bus protocol may be PCIe, and an operator may wish to replace some SAS mass storage devices with NVMe mass storage devices. Some embodiments may be able to accommodate such a replacement without requiring other changes in the system.

The storage adapter circuit and/or any other relevant devices or components according to embodiments of the present invention described herein may be implemented utilizing any suitable hardware, firmware (e.g. an application-specific integrated circuit), software, or a combination of software, firmware, and hardware. For example, the various components of the storage adapter circuit may be formed on one integrated circuit (IC) chip or on separate IC chips. Further, the various components of the storage adapter circuit may be implemented on a flexible printed circuit film, a tape carrier package (TCP), a printed circuit board (PCB), or formed on one substrate. Further, the various components of the storage adapter circuit may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, and/or the like. Also, a person of skill in the art should recognize that the functionality of various computing devices may be combined or integrated into a single computing device, or the functionality of a particular computing device may be distributed across one or more other computing devices without departing from the scope of the example embodiments of the present invention.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section, without departing from the spirit and scope of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that such spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art. As used herein, the term "major component" means a component constituting at least half, by weight, of a composition, and the term "major portion", when applied to a plurality of items, means at least half of the items.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present invention". Also, the term "exemplary" is intended to refer to an example or illustration. As used herein, the terms "use," "using," and "used" may be considered synonymous with the terms "utilize," "utilizing," and "utilized," respectively.

It will be understood that when an element is referred to as being "on", "connected to", "coupled to", or "adjacent to" another element, it may be directly on, connected to, coupled to, or adjacent to the other element, or one or more intervening elements may be present. In contrast, when an element is referred to as being "directly on", "directly connected to", "directly coupled to", or "immediately adjacent to" another element, there are no intervening elements present.

Any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

Although example embodiments of a multi-protocol IO infrastructure for a flexible storage platform have been specifically described and illustrated herein, many modifications and variations will be apparent to those skilled in the art. Accordingly, it is to be understood that a multi-protocol IO infrastructure for a flexible storage platform constructed according to principles of this invention may be embodied other than as specifically described herein. The invention is also defined in the following claims, and equivalents thereof.

What is claimed is:

1. A storage system, comprising:
    a storage motherboard, comprising:
        a first plurality of storage interface connectors;
        a cable connector; and
        a storage adapter circuit having a host side interface connected to the cable connector and a first plurality of storage side interfaces, each connected to a respective storage interface connector of the storage interface connectors, the storage adapter circuit comprising:
            a first protocol translator, configured to translate communications from a host interface protocol to a first storage interface protocol;
            a second protocol translator, configured to translate communications from a host interface protocol to a second storage interface protocol;
            a first consolidation device configured to connect the first protocol translator to a plurality of storage devices configured to use the first storage interface protocol;
            a second consolidation device configured to connect the second protocol translator to a plurality of storage devices configured to use the second storage interface protocol; and
            a storage adapter circuit controller configured to:
                detect a protocol of a mass storage device connected to a connector of the first plurality of storage interface connectors,
                connect the first protocol translator to the host side interface, and connect the first consolidation device between the first protocol translator and the first plurality of storage side interfaces, when the detected protocol is the first protocol, and
                connect the second protocol translator to the host side interface, and connect the second consolidation device between the second protocol translator and the first plurality of storage side interfaces, when the detected protocol is the second protocol.

2. The system of claim 1, wherein:
    the first protocol translator is a PCIe host bus adapter for SAS, and
    the first consolidation device is a SAS expander.

3. The system of claim 2, wherein:
    the second protocol translator is a PCIe host bus adapter for SATA, and
    the second consolidation device is a SATA expander.

4. The system of claim 1, further comprising a third consolidation device configured to connect to a plurality of storage devices configured to use the host interface protocol,
    wherein the storage adapter circuit controller is further configured to connect the third consolidation device to the host side interface, when the detected protocol is the host interface protocol.

5. The system of claim 4, wherein the host interface protocol is PCIe.

6. The system of claim 4, wherein the host interface protocol is Ethernet.

7. The system of claim 1, wherein:
    the first protocol translator is a PCIe host bus adapter for SAS, and
    the first consolidation device is a SAS expander.

8. The system of claim 7, wherein:
    the second protocol translator is a PCIe host bus adapter for SATA, and
    the second consolidation device is a SATA expander.

9. The system of claim 1, wherein the first consolidation device comprises a routing circuit.

10. The system of claim 1, wherein the first storage interface protocol is selected from the group consisting of SATA, SAS, FibreChannel, NVMe, Ethernet, and USB.

11. The system of claim 1, wherein a connector of the first plurality of storage interface connectors is compatible with at least two different storage interfaces.

12. The system of claim 1, wherein a connector of the first plurality of storage interface connectors comprises an SFF8639 connector.

13. The system of claim 1, further comprising a mass storage device connected to a storage connector of the first plurality of storage interface connectors by a data path comprising a portion selected from the group consisting of a cable, a plurality of printed circuit board traces, and a wireless link.

14. The system of claim 1, wherein the cable connector comprises a PCIe connector, and the host interface protocol is PCIe.

15. A computing system, comprising:
    a rack tray for a 19-inch rack, the rack tray comprising:
        a host motherboard comprising a CPU and memory, and
        a storage motherboard according to claim 1.

* * * * *